United States Patent [19]
Kawai

[11] 4,384,227
[45] May 17, 1983

[54] ARMATURE WINDING FOR A DYNAMOELECTRIC MACHINE

[75] Inventor: Shigetaka Kawai, Kobe, Japan

[73] Assignee: Mitsubishi Denki Kabushiki Kaisha, Tokyo, Japan

[21] Appl. No.: 270,394

[22] Filed: Jun. 4, 1981

[30] Foreign Application Priority Data

Jun. 9, 1980 [JP] Japan .................... 55-78197

[51] Int. Cl.³ .......................... H02K 3/14
[52] U.S. Cl. ...................... 310/213; 174/34
[58] Field of Search ............ 310/213; 174/34; 336/187

[56] References Cited

U.S. PATENT DOCUMENTS

| | | | |
|---|---|---|---|
| 1,144,252 | 6/1915 | Roebel | 310/213 |
| 2,821,641 | 1/1958 | Ringland | 310/213 |
| 3,118,015 | 1/1964 | Willyoung | 310/213 |
| 3,280,244 | 10/1966 | Pannen | 310/213 |
| 3,602,751 | 8/1971 | Brenner et al. | 310/213 |
| 3,647,932 | 3/1972 | Heller et al. | 310/213 |
| 3,825,783 | 7/1974 | Duffert | 310/213 |

FOREIGN PATENT DOCUMENTS 2037091 7/1980 United Kingdom ............ 310/213

*Primary Examiner*—R. Skudy
*Attorney, Agent, or Firm*—Wenderoth, Lind & Ponack

[57] ABSTRACT

A dynamoelectric machine having a generally cylindrical armature, the armature having a core including a plurality of slots in the circumferential edge thereof, in which a plurality of coils are wound in a plurality of poles and phases, the coils having a plurality of separate individual strands, wherein the strands of the coils are overlapped in a plurality of levels with each strand being transposed along the length of the coils in relation to the other strands such that they are transposed in the slot sections by an angle of substantially 360 degrees divided by the number of segments or strand groups over which the strands are to be transposed, and are reverse transposed at the end connecting portions by an angle of substantially 360 degrees divided by twice the number of segments or strand groups over which the strands are to be transposed, such that a total transposition substantially equal to 360 degrees will be achieved across all the segments or strand groups, whereby even in devices with short armature cores, or a large number of strand levels, circulating currents between the strands can be effectively suppressed, and whereby the work of physically effecting the transposition is simplified, requiring less time and lower cost than prior modes of transposition.

5 Claims, 11 Drawing Figures

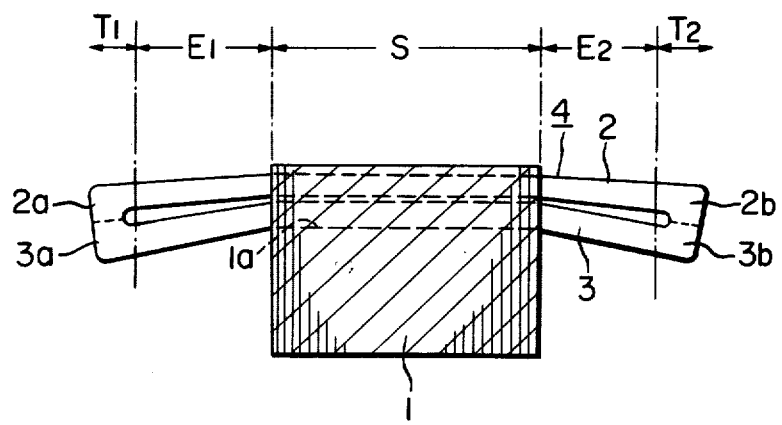
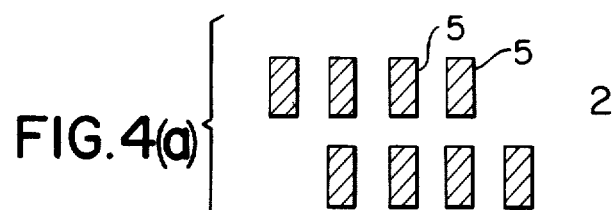
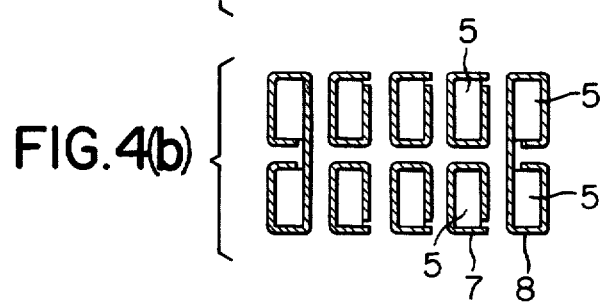
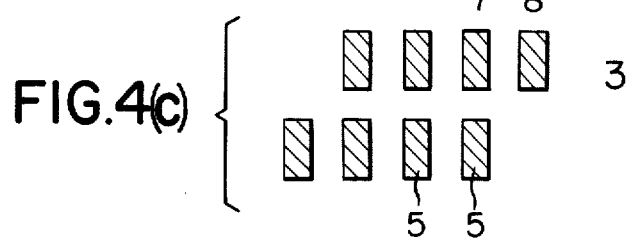

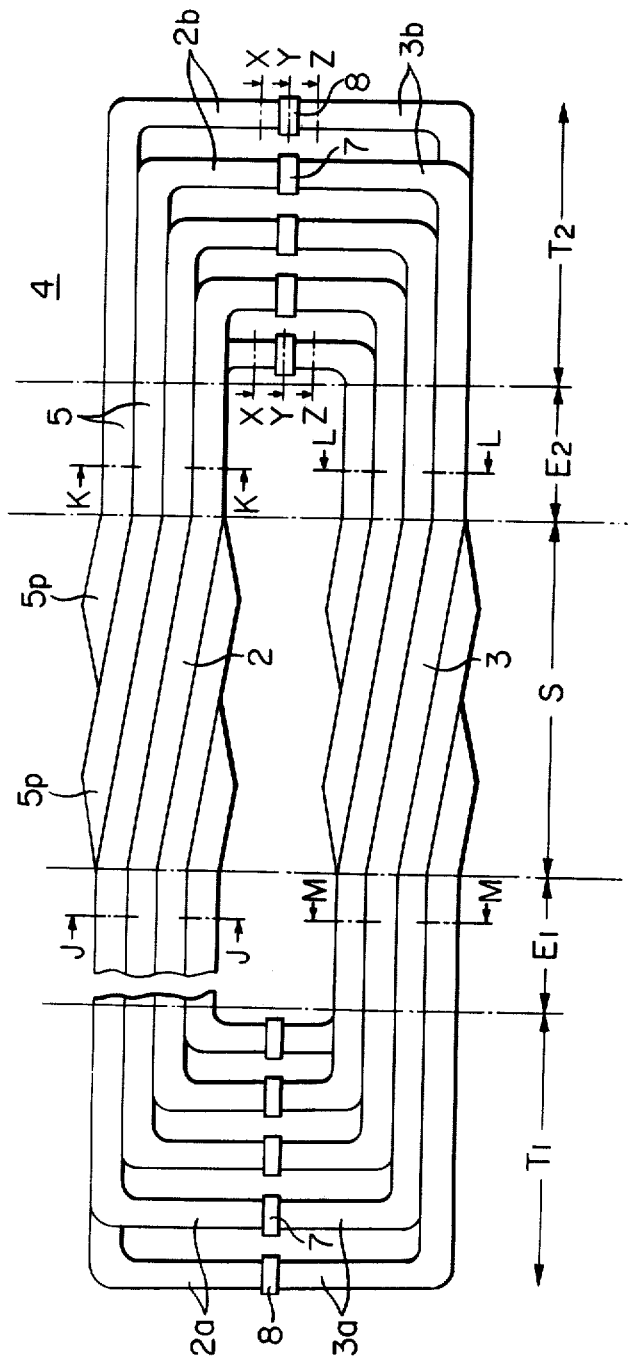

ARMATURE WINDING FOR A DYNAMOELECTRIC MACHINE

BACKGROUND OF THE INVENTION

1. Field of the Invention

This invention relates to armature windings for a dynamoelectric machine wherein a plurality of strands of a divided coil conductor are transposed.

2. Description of the Prior Art

The armature windings of dynamoelectric machines are generally formed with the coil conductors divided into a plurality of strands to prevent the eddy currents that are produced in a conductor by the magnetic flux interlinking the coil conductors.

However, the separated individual strands mutually produce a potential difference due to the magnetic flux effect, and a circulating current flows between the strands. This, however is prevented by providing a transposition among the strands.

A transposition among the strands of prior armature windings typically involved transposing each strand through 360° about the axial length of the conductor inside the slots in the armature core so that each strand is rotated through each relative position about the axial length of the conductor in the space between the point where the conductor enters the slot and the point where it leaves.

However, this prior method of transposing the strands in a winding required twice as many crossings between the rows of strand as there were strands, and so in devices with a short armature core or a large number of strand layers, the pitch of the crossings became exceedingly small making them impracticable for use in manufacturing from the point of limitations in size.

SUMMARY OF THE INVENTION

It is an object of the present invention to do away with the aforementioned drawbacks of the prior art, by providing an armature winding wherein the circulating currents between the strands are effectively suppressed, even in devices with a short armature core or a large number of strand layers, by making the transposition of the strands within the slot portions an angle of substantially 360 degrees divided by the number of segments of the strands (or strand groups) over which the strands are to be transposed, and displacing the positions of the strands with respect to another coil at the connecting portions to connect with a reverse transposition of an angle equal to substantially half the angle of transposition within the slots, such that every strand is transposed through an overall angle of 360 degrees or an angle close thereto, as the coil group of a single phase makes a complete circuit through every slot portion.

BRIEF DESCRIPTION OF THE DRAWINGS

The present invention will now be described in conjunction with a preferred embodiment thereof taken with the accompanying drawings, in which:

FIG. 1 is a side elevational sectional view of a dynamoelectric machine;

FIG. 2 is an explanatory sketch showing the displacement of the coil of an armature winding according to an embodiment of the present invention, as seen from the side;

FIG. 3 is a plan view of the slot portion of the coils of FIG. 2;

FIG. 4(a) is a sectional view taken along the line X—X in FIG. 2;

FIG. 4(b) is a sectional view taken along the line Y—Y in FIG. 2;

FIG. 4(c) is a sectional view taken along the line Z—Z in FIG. 2;

DESCRIPTION OF THE PREFERRED EMBODIMENTS

Figure 5:
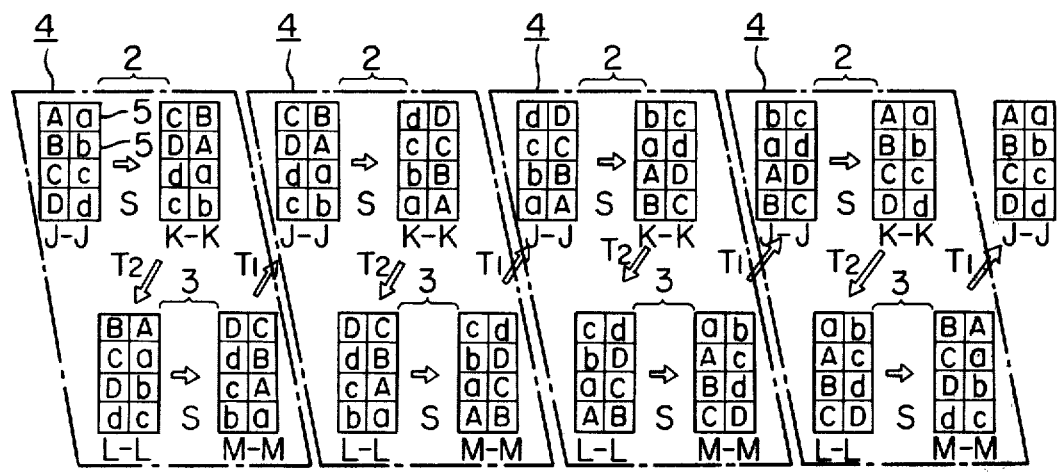
FIG. 5 is an explanatory sketch of the disposition of the transposed strands illustrating sections taken along the lines J—J, K—K, L—L and M—M at the end portions of the coils of FIG. 2 with the views of the sections along the lines L—L and M—M shown back to front for continuity of rendition and ease of understanding.

FIG. 1 is a side elevational sectional view of an armature of a typical dynamoelectric machine, such as that with which this invention may be used, wherein a rotary armature core 1 has a plurality of slots 1a in the circumferential edge thereof, inserted into which are the straight portions of a top coil 2 and a bottom coil 3, each of which forms a half coil, the connecting portion 2b at one end of the top coil 2, and the connecting portion 3b at one end of the bottom coil 3 in a slot 1a separated by the spacing pitch between poles, are joined, to form a single full coil 4. The connecting portion 2a at the other end of the top coil 2 is connected to the bottom coil of an adjacent coil of the same pole and phase (or the crossing lead between coil groups), and the connecting portion 3a at the other end of the bottom coil 3 is connected to the top coil of an adjacent coil of the same pole and phase (or the crossing lead between coil groups). In the top and bottom coils 2 and 3, the section marked S in the figure is the slot portion, the sections $E_1$ and $E_2$ are the end portions, and $T_1$ and $T_2$ are the connecting portions.

FIG. 2 is an explanatory sketch to show the transposition of the strands, showing the coil of a winding of an armature according to an embodiment of the present invention viewed from the side, and FIG. 3 depicts in plan view the slot portion of the coil of FIG. 2. The respective individual insulated strands 5 of the top and bottom coils 2 and 3 are transposed in the slot portion S by a suitable angle less than 360°. In the figure, for two rows and four levels of strands 5, the angle of transposition—the difference in position between two individual strands—is substantially 90 degrees and the number of crossings 5p between the rows is two each for the top and bottom coils 2 and 3. Each strand 5 has its top coil 2 and bottom coil 3 of the same coil, connected by connectors 7 and 8 at the connecting portions $T_2$. Also, at the connecting portions $T_1$, the top coil 2 and a bottom coil 3 of an adjacent coil of the same pole and phase, and the bottom coil 3 and a top coil 2 of an adjacent coil of the same pole and phase, are respectively connected by the connectors 7 and 8. The connections of the strands 5 at these connecting portions $T_1$ and $T_2$, vary the position of the strand as viewed in the direction of advance of the strands 5. In the figures, this is a positional change equal to one strand 5, or a transposition of substantially 45 degrees.

FIGS. 4(a), 4(b) and 4(c) show sectional views taken along the lines X—X, Y—Y, and Z—Z in FIG. 2, respectively, and correspondingly show the positions of each strand 5. Each strand 5 of the top and bottom coils 2 and 3 is respectively joined by a suitable connector 7, 8, and the strands are connected by soldering or welding.

FIG. 5 is an explanatory sketch showing the transposed states of each of the strands 5 across one phase, along the direction of advance of the coil by sectional views of the end portions $E_1$ and $E_2$ of FIG. 2, taken along the lines J—J, K—K, L—L, and M—M. Each section faces in the direction of advance of the coil (shown by the arrow), and in order to make the transposed state of the bottom coil 3 easier to grasp, it is shown reversed through 180°. In the figures, the number of coils 4 (full coils) of each pole and phase is four, and there are respectively four top coils 2 and four bottom coils 3. The letters A-D and a-d denote the 8 individual parallel connected strands of a series connected circuit. The region of a coil 4 is denoted by a chain-line box. Each strand 5 has its top coils 2 and bottom coils 3 transposed by substantially 90° in the direction of advance, in each slot portion S, and at the connecting portions $T_1$ and $T_2$, they are transposed by substantially 45° in the return direction, the direction opposite to the direction of transposition in the slot portions S, this being repeated for each of four coils for each pole and phase, and the positions of each strand 5 occupied at the slot portion S are transposed respectively by substantially 360 electrical degrees through a full circuit of the top coils 2 and the bottom coils 3. Thus, the electromotive force of each parallel strand 5 in the coil groups of each pole and phase is in equilibrium, and the current distribution is uniform.

Figure 6:
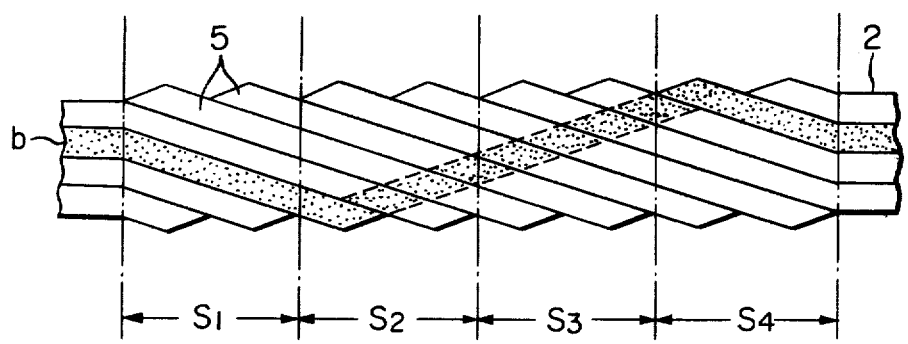
FIG. 6 is an explanatory sketch of the transposition showing the track of the transpositions of the coil of FIG. 2 through the consecutive slot portions of a single phase, with the end and connecting portions omitted for simplicity.

FIG. 6 is an explanatory sketch of the transposition, showing the slot portions of all (four) of the top coils 2 in a single phase of each pole, of the coil, continuously (with the connecting portions $T_1$ and $T_2$ omitted), the slot portions being indicated as $S_1$ for the first top coil 2, $S_2$ for the second, and so on. Strand 'b' in FIG. 6 corresponds to strand 'b' in FIG. 5. Each strand 5, considered in terms of the whole of a single phase, has the same positional change over the total slot portions as the transposition of 360 degrees of the prior art, and each strand is balanced with regard to the magnetic flux in the slots.

Figure 7:
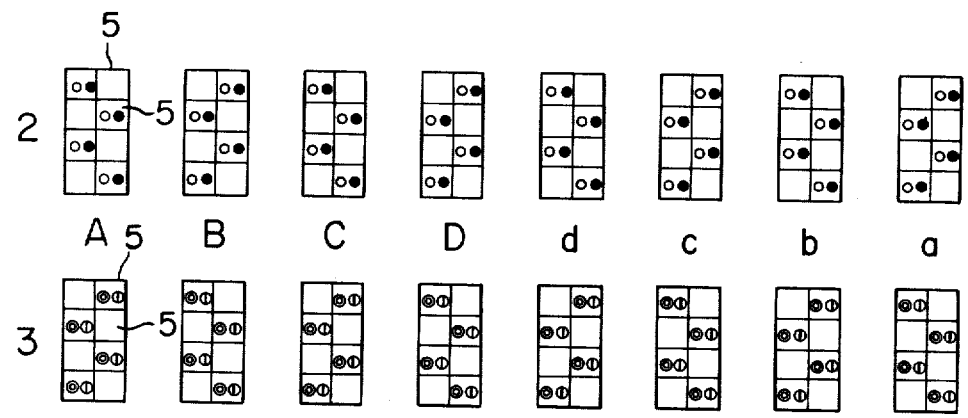
FIG. 7 is an explanatory sketch showing the positions of the strands at the end portions of a single phase of the coil of FIG. 2, for each individual strand.

FIG. 7 shows the position occupied by each strand 5 of the coil of FIG. 2 at the ends of the top and bottom coils 2 and 3 across one phase of each pole, for each strand 5. The marks O, ●, ⊚ and ⓘ respectively indicate the positions occupied by the strands in the cross-sections along the lines J—J, K—K, L—L, and M—M, the upper portion being the top coil 2 and lower portion being the bottom coil 3. Each strand A-D and a-d of the strands 5 occupies the same position up and down and left and right, and they are all balanced with regard to the magnetic flux in the circumferential and radial directions.

As explained hereinabove, the effects of balancing each of the strands 5 is achieved because the number of strand levels is made equal to the number, four, of coils in each pole and phase, and in the slot portions of the top and bottom coils 2 and 3 a transposition equivalent to two strands, i.e. 90 degrees is effected, and at the connecting portion of the coil end, a reverse transposition equivalent to one strand (45 degrees) is effected.

That is to say, the transposition is divided into segments or strand groups with respect to the number of strand levels, the number of segments or strand groups being a number N, the top and bottom coils 2 and 3 being transposed in the slot portions by 360 degrees $\times N^{-1}$, and by 360 degrees $\times (2\ N)^{-1}$ in the connection portions, and so it is possible to balance each line in relation to the acting magnetic flux, with regard to an armature winding when the number of coils of each pole and phase is equal to the number of strand levels (which is the same as the number of segments N).

Furthermore, according to this invention, similar effects can be achieved by application in a case where the number of coils of each pole and phase is m·N. That is, by repeating the transposition shown in the above-mentioned FIG. 5 m number of times, the transposition track of the slot portions of FIG. 6 will have a balanced transposition of 360 degrees $\times$ m, and the end portion positions of FIG. 7 are each multiplied by m, whereby a balanced position state is achieved.

Figure 8:
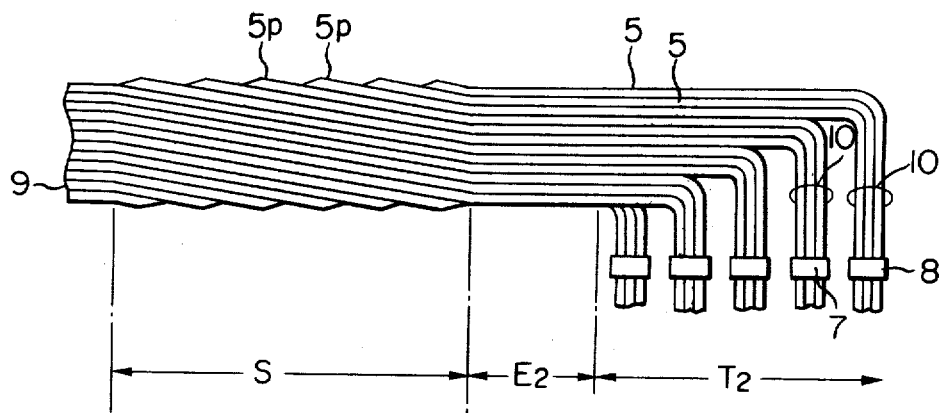
FIG. 8 is an explanatory sketch of the transposition of a portion of the top coils of an armature winding according to another embodiment of this invention, as seen from the side.
Figure 9:
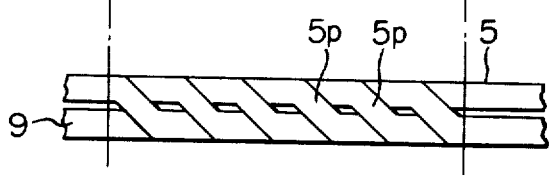
FIG. 9 is a plan view of the slot portion of the coils of FIG. 8.

Also, where the number of strand levels is M, and the number of coils of each pole and phase is M·$n^{-1}$, if the number of strand levels m is segmented by N ($N = M \cdot n^{-1}$, the same as the number of coils), and transposition is effected over the number of segments N, effects similar to those in the abovementioned embodiment will be achieved. That is to say, if the top and bottom coils are transposed by 360 degrees $\times N^{-1}$ in each slot portion and are reverse transposed by 360 degrees $\times (2\ N)^{-1}$ at each connecting portion, each strand will be balanced. In this case, it is desirable to use the connectors 7 and 8 of FIG. 2 on each strand. However, if there is a large number of strands, it is possible to arrange them as shown in the explanatory sketch and the plan view of FIGS. 8 and 9 which show the side face of a portion of the upper coils. The individual strands 5 of the top coil 9 and the bottom coil (illustration omitted) are divided up into several segments or strand groups 10, these groups 10 being joined by the connectors 7 and 8 whereby each segment or strand group 10 is balanced within a phase. The strands 5 within an individual group 10 are shorted at both ends of the top coil 9 and the bottom coil, so a certain amount of circulating current will flow, but unlike a case where all the strands 5 in a half coil are shorted at both ends, the circulating current between the strand 5 within the individual groups 10 does not become very large. Accordingly, it is possible to make good use of this construction within strand groups 10 are assembled, by grasping the extent of the additional losses and controlling the temperature design.

As explained hereinabove, desirable results are achieved by making the relationship between the number of strand levels and the number of coils of each pole and phase such that the one is a multiple by an integer of the other, and even if the results are not ideal, the integer multiple relationship can always be employed to obtain substantially balanced results. For example, where the number of coils of each pole and phase is 7, and the number of strand levels M is 6, the number of transposition segments N is 6, such that the transposition in the slot portions is substantially 60 degrees, and the reverse transposition at the connecting portion is substantially 30 degrees, whereby the transposition track of a slot portion in one phase, corresponding to FIG. 6, is 420 electrical degrees (360°+60°=420°), and the end portion strand positions corresponding to FIG. 7 have ○, ●, ⊙, and ⊕ symbols for one full coil added. That is to say, for a single phase of 7 coils, 6 coils are balanced, and the positions of the strands of the remaining one coil are unbalanced, whereby a certain circulating current flows. However, the series connected length of the coils of a single phase is very long, and the impedance with regard to the circulating current between the strands, too, is sufficiently large that additional losses can be made sufficiently small. Accordingly, even when the relationship between the number of coils of each pole and phase, and the number of strand levels is not a multiple by an integer, by appropriate temperature design it is still possible to employ the method of transposition proposed by this invention.

As discussed hereinabove, according to this invention the transposition of the strands in the slot portion of the coil is made an angle of substantially 360 degrees divided by the number of segments over which the strands are to be transposed, and the positions of the strands with respect to another coil are displaced at the connecting portions to connect with a reverse transposition of an angle equal to substantially half the angle of transposition within the slots, such that every strand is transposed through an overall angle of 360 degrees or an angle close thereto, as the coil group of a single phase makes a complete circuit through each slot portion, so that even in devices with short armature cores, or a large number of strand levels, circulating currents between the strands can be effectively suppressed. Further, even in prior devices where a 360 degree transposition within a slot portion has been used, to the extent that no practical interference is caused, the work of physically effecting the transposition can be somewhat simplified and reduced both in the amount of time required, and in cost, by adopting the mode of transposition proposed by this invention.

What I claim is:

1. A dynamoelectric machine comprising a generally cylindrical armature, said armature comprising a core including a plurality of slots in the circumferential edge thereof, in which a plurality of coils are wound in a plurality of poles and phases, said coils comprising a plurality of separate individual strands arranged in strand groups, wherein said strands of said coils are overlapped in a plurality of levels with each strand being transposed along the length of the coil in relation to the other of said strands such that they are transposed in the sections of said slots by an angle of substantially 360 degrees divided by the number of said strand groups over which the strands are to be transposed, and are reverse transposed at the end connecting portions by an angle of substantially 360 degrees divided by twice the number of said strand groups over which the strands are to be transposed, such that a total transposition substantially equal to 360 degrees will be achieved across all of said strand groups.

2. A dynamoelectric machine as claimed in claim 1, wherein the number of said strand groups over which the strands are to be transposed is made equal to the number of said strand levels.

3. A dynamoelectric machine as claimed in claim 1, wherein the number of said strand groups over which the strands are to be transposed is made equal to a number of groups of said strand levels.

4. A dynamoelectric machine as claimed in any one of claims 1, 2, or 3, wherein the number of said strand groups over which the strands are to be transposed is equal to the number of said coils of each of said pole and phase.

5. A dynamoelectric machine as claimed in any one of claims 1, 2, or 3, wherein the number of said coils of each said pole and phase is related to the number of said strand groups over which the strands are to be transposed by a relationship which is a multiple of an integer greater than one.

* * * * *